United States Patent [19]

O'Rear et al.

[11] 4,390,413
[45] * Jun. 28, 1983

[54] HYDROCARBON UPGRADING PROCESS

[75] Inventors: Dennis J. O'Rear, Tiburon; Jerome F. Mayer, San Anselmo, both of Calif.

[73] Assignee: Chevron Research Company, San Francisco, Calif.

[*] Notice: The portion of the term of this patent subsequent to Feb. 17, 1998, has been disclaimed.

[21] Appl. No.: 194,729

[22] Filed: Oct. 6, 1980

Related U.S. Application Data

[63] Continuation-in-part of Ser. No. 107,231, Dec. 26, 1979, Pat. No. 4,251,348, which is a continuation-in-part of Ser. No. 41,209, May 21, 1979, Pat. No. 4,282,085, which is a continuation-in-part of Ser. No. 954,062, Oct. 23, 1978, Pat. No. 4,171,257.

[51] Int. Cl.³ .................... C10G 11/05; C10G 45/02
[52] U.S. Cl. ........................... 208/61; 208/68; 208/70; 208/89; 208/100; 208/102; 208/111; 208/254 R; 568/579; 568/697; 585/415

[58] Field of Search ................ 208/58, 61, 78, 79, 208/89, 120; 568/579; 585/415

[56] References Cited

U.S. PATENT DOCUMENTS

| | | | |
|---|---|---|---|
| 3,700,585 | 10/1972 | Chen et al. | 208/111 |
| 3,755,145 | 8/1973 | Orkin | 208/111 |
| 3,758,403 | 4/1973 | Rosinski et al. | 208/120 |
| 3,894,939 | 7/1975 | Garwood et al. | 208/111 |
| 4,067,797 | 1/1978 | Chen et al. | 208/15 |
| 4,171,257 | 10/1979 | O'Rear et al. | 208/120 |
| 4,251,348 | 2/1981 | O'Rear et al. | 208/61 |
| 4,282,085 | 8/1981 | O'Rear et al. | 208/89 X |

Primary Examiner—Delbert E. Gantz
Assistant Examiner—G. E. Schmitkons
Attorney, Agent, or Firm—D. A. Newell; W. H. Hooper; W. L. Stumpf

[57] ABSTRACT

A petroleum distillate feed is upgraded and an olefinic product is produced by contacting the feed with ZSM-5-type zeolite at (1) a temperature in the 500° F.–800° F. range; (2) a pressure below about 13 atmospheres gauge; and (3) an LHSV in the 0.1–15 V/V/Hr range.

28 Claims, 3 Drawing Figures

HYDROCARBON UPGRADING PROCESS

CROSS-REFERENCE TO RELATED APPLICATIONS

This application is a continuation-in-part of our copending application Ser. No. 107,231 (now U.S. Pat. No. 4,251,348), filed Dec. 26, 1979, which is a continuation-in-part of our copending application Ser. No. 41,209, filed May 21, 1979 (now U.S. Pat. No. 4,282,085), which in turn is a continuation-in-part of our application Ser. No. 954,062, filed on Oct. 23, 1978, now U.S. Pat. No. 4,171,257, Oct. 16, 1979.

BACKGROUND OF THE INVENTION

1. Field of the Invention

In the processing of petroleum distillates and other hydrocarbonaceous feeds, the presence of paraffins is often undesirable. For example, when a distillate is hydrocracked, the paraffins will be cracked in significant and undesirable amounts to light paraffinic gases, which are usually burned or used as LPG fuels and which are not useful for further processing.

Because losses to relatively low profit gases are significant, there is a continuing search for methods of dewaxing petroleum distillates by processes yielding chemical products which are amenable to further processing to more profitable products.

We have discovered that under certain processing conditions, ZSM-5-type zeolites can be used to dewax, or to remove paraffins, from petroleum and other hydrocarbonaceous feedstocks by forming $C_3$-$C_4$ olefins which are valuable chemicals amenable to further processing steps. Further, the residual uncracked material has improved characteristics useful for reforming operations to make gasoline.

These benefits are achieved through a process which uses a ZSM-5-type catalyst in a matrix substantially free of hydrocarbon cracking activity and a low nitrogen feedstock. Additionally, the process of this invention is particularly useful because the coking and deactivation rate of the catalyst composite is exceptionally low leading to greater efficiency in refinery operations. Further, the process can be practiced at any stage of hydrocarbon processing where it is desired to remove normal or slightly branched paraffins without detrimentally affecting the other chemical components of a feed.

We have also discovered that gas oil range feedstocks can be used more efficiently in making jet fuel. Higher end point jet fuel is produced. The jet fuel has good freeze and smoke points and is produced in high yield.

BACKGROUND ART

Dewaxing or virgin petroleum distillates using a ZSM-5 catalyst is known in the literature (see, for example, U.S. Pat. Nos. 3,894,939—W. E. Garwood—and 4,067,797—N. Y. Chen et al). However, these known processes suffer from disadvantages, including (1) high catalyst fouling or deactivating rates and (2) little or none of the $C_3$-$C_4$ product fraction is $C_3$-$C_4$ product olefins.

U.S. Pat. No. 3,758,403, Rosinski et al, Sept. 11, 1973, discloses the catalytic cracking of hydrocarbons with mixtures of ZSM-5 and other zeolite catalysts under cracking conditions.

It is an object of this invention to provide a novel process for carrying out the catalytic upgrading of petroleum distillates in a more effective and efficient manner.

It is an object of this invention to provide a process in which at least a substantial portion of the product produced by catalytically dewaxing a distillate using a ZSM-5-type zeolite is a $C_3$-$C_4$ olefin containing fraction.

Other and additional objects of this invention will be clear from a consideration of the complete specification including the claims thereof.

TECHNICAL DISCLOSURE

The discovery of the present invention is embodied in a process for upgrading a hydrocarbonaceous feed consisting essentially of hydrocarbons having a normal boiling point in the range of from about 180° F. to about 1200° F. and producing at least a substantial $C_3$-$C_4$ olefin product fraction, by (1) producing a process stream by contacting said feed with a catalyst comprising a ZSM-5-type crystalline aluminosilicate in a form which is substantially free of hydrogenation activity, said contacting being under conditions including (a) a temperature in the range of from about 500° F.–800° F.; (b) a pressure below about 13 atmospheres gauge, and (c) a liquid hourly space velocity in the range of from about 0.1 to 20, said feed having a content of nitrogen-containing impurities, calculated by weight as nitrogen, below about 5 ppm; and (2) recovering an upgraded effluent stream and olefin fraction by fractionating said process stream.

The present invention is further embodied in a petroleum distillate upgrading process wherein the portion of the catalyst, which is not a ZSM-5-type zeolite, is substantially free of hydrocarbon cracking activity.

The process of the present invention for upgrading petroleum distillate feeds can be used in conjunction with other processes known to the art such as hydrocracking and reforming. These well known processes typically occur under hydrogenation conditions and chemically change the contents of their feedstocks. Hydrocracking and catalytic reforming processes are typically operated under a significant partial pressure of hydrogen produced by a hydrogen-rich recycle gas rate of 500 or more SCF hydrogen per barrel of feed. Hydrogenation conditions are well known to the art and typically include, in addition to a significant hydrogen partial pressure, a moderate to high overall pressure as well as a catalyst having hydrogenation/dehydrogenation activity, e.g., nickel, palladium, and platinum catalysts.

The discovery of the present invention is further embodied in a process for increasing the effectiveness of hydrocarbon processing, comprising:

(a) upgrading a hydrocarbonaceous feed having a normal boiling point range above about 180° F. and below about 1200° F., through use of an upgrading process comprising, producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F.–800° F.; (b) a pressure below about 13 atmosphere gauge; and (c) a liquid hourly space velocity in the range of from about 0.1 to 20, said feed having a content of nitrogen-containing impurities, calculated by weight as nitrogen, below about 5 ppm; in conjunction with (b) converting the components of a hydrocarbonaceous feedstock.

By use of the phrase "in conjunction with" is meant that all or part of the process stream can be the feedstock for the conversion process, or, the effluent of the conversion process can be the feed for the upgrading process, or, the upgrading process can be operated in a recycle mode with the conversion process.

Figure 4:
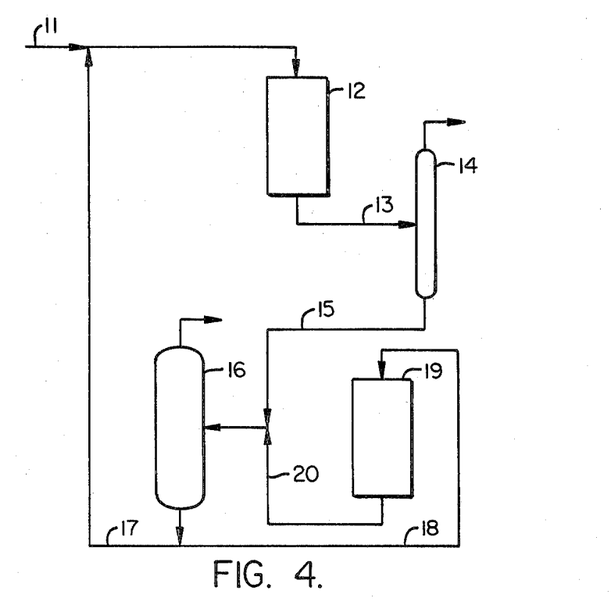
Figure 5:
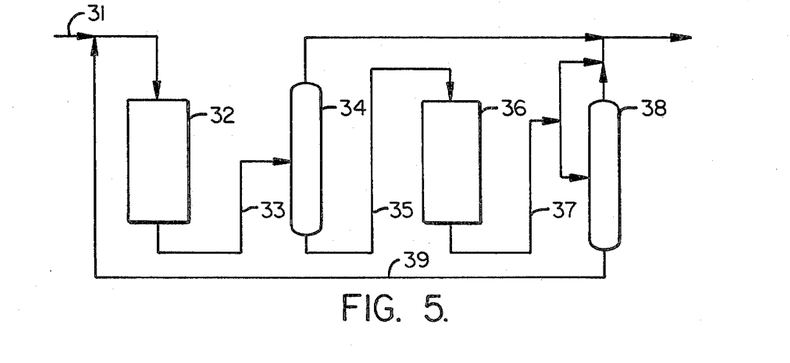

By "recycle mode" as used herein is meant a processing scheme wherein all or part of the effluent from the upgrading process is the hydrocarbonaceous feedstock for the conversion process and all or part of the effluent from the conversion process is feed for the upgrading process, in the manner of FIGS. 4 and 5.

Intermediate process steps, such as stripping, splitting or fractionating, can be used to remove desirable chemicals from the process streams and to recover desirable boiling range feeds or feedstocks for introduction into step (a) or (b).

The unique characteristic of using the upgrading process of the present invention in conjunction with processes of the art, such as hydrocracking and reforming, is that the overall effectiveness of the petroleum processing is increased since the hydrocracking and reforming steps do not operate efficiently on the normal or slightly branched paraffins. Those chemicals have been removed by the upgrading process in an olefinic $C_3$–$C_4$ fraction instead of as light gas paraffins. The $C_3$–$C_4$ olefins are more valuable chemically than the corresponding light gas paraffins.

The great efficacy and attractiveness of the upgrading process is that it can be used at any stage of refinery operation where the feed to be upgraded is appropriate and where it is desirable to remove only straight and slightly branched chain paraffins with minimal capital expenditure. Because of the activity of the catalyst and its low deactivation rate, a fixed-bed reactor can be used for extended periods of time without the necessity of the regeneration requirements of a Fluid Catalytic Cracking apparatus. By "nitrogen-containing impurities" as used herein is meant organic nitrogen-containing compounds indigenous to crude petroleum and syncrude oils and/or as present in their conventionally hydroprocessed distillate fractions.

THE CATALYST

The ZSM-5-type catalyst employed is a crystalline aluminosilicate zeolite having a silica to alumina ratio greater than 12 and preferably greater than 30 and is exemplified by ZSM-5, ZSM-8, ZSM-11, ZSM-12, ZSM-21 and other similarly-acting aluminosilicates described in the literature. For example, ZSM-5 is described in U.S. Pat. Nos. 3,702,886 and 3,770,614; ZSM-8 is described in U.S. Pat. No. 3,700,585; ZSM-11 is described in U.S. Pat. No. 3,709,979; ZSM-12 is described in U.S. Pat. No. 3,832,449; and ZSM-21 is described in U.S. Pat. No. 3,948,758. Relevant portions of these patents are incorporated herein by reference. The ZSM-5-type catalyst may be in the hydrogen form or in a metal cation or cation complex form which possesses little or no hydrogenation activity, such as a calcium, strontium, barium, zinc, copper, silver or rare earth form, with the hydrogen form being preferred. Hydrogenation activity of a catalyst is the capability of the catalyst to adsorb and dissociate molecular hydrogen.

The hydrogen and other forms of the ZSM-5-type zeolite may be obtained by conventional base and/or ion-exchange methods routinely employed in the zeolite art, including customary drying and calcining steps. Preferably, the ZSM-5-type zeolite catalyst herein has a minimal sodium content, for example, by weight less than 1 weight percent, more preferably less than about 100 ppm, although a ZSM-5-type zeolite having a larger sodium content exhibits a relatively useful catalytic activity for present purposes.

The ZSM-5-type catalyst can be in any convenient form, that is, as required for ordinary fixed-bed, fluid-bed or slurry use. The catalyst can be composited with binders or it can be tableted without binders. Preferably, it is used in a fixed-bed reactor and in a composite with a porous inorganic binder or matrix in such proportions that the resulting product contains from 1% to 95% by weight, and preferably from 10% to 70% by weight, of the zeolite in the final composite. It is extremely desirable that the porous inorganic binder or matrix have substantially no hydrocarbon cracking activity, especially where fixed-bed use is desired. Where the inorganic binder has little or no hydrocarbon cracking activity, the ZSM-5-type catalyst composite is unsuitable for use in cracking systems which require the formation of coke to maintain an economical heat balance between the cracking reactor and the regeneration reactor. Such a system is a Fluid Catalytic Cracking (FCC) system in which a substantial part of the heat required in the cracking bed is supplied by the burning of the coke from the FCC catalyst during regeneration.

The term "porous matrix" includes inorganic compositions with which a zeolite can be combined, dispersed, or otherwise intimately admixed wherein the matrix may be catalytically active in a hydrocarbon cracking sense, but preferably inactive. The porosity of the matrix can either be inherent in the particular material or it can be caused by mechanical or chemical means. Representative of satisfactory matrices include pumice, firebrick, diatomaceous earths, and inorganic oxides. Representative inorganic oxides include alumina, silica, amorphous silica-alumina mixtures, naturally occurring and conventionally processed clays, for example, bentonite, kaolin and the like, as well as other siliceous oxide mixtures such as silica-magnesia, silica-zirconia, silica-titania and the like. The preferred inorganic matrices are those having low acidity—hence low hydrocarbon cracking activity—unmixed metal oxides, for example, alumina, silica, zirconia, titania, or magnesia rather than mixtures of oxides. Where mixtures of oxides are used, there is a greater tendency for the binder/matrix itself to have sufficient hydrocarbon cracking activity to cause substantial and undesirable increases in the coking rates, thereby losing a significant advantage for refinery operations.

The compositing of the zeolite with an inorganic oxide matrix can be achieved by any suitable known method wherein the zeolite is intimately admixed with the oxide while the latter is in a hydrous state, for example, as a hydrosol, hydrogel, wet gelatinous precipitate, or in a dried state or combinations thereof. A convenient method is to prepare a hydrous mono or plural oxide gel or cogel using an aqueous solution of a salt or mixture of salts, for example, aluminum sulfate, sodium silicate and the like. To this solution is added ammonium hydroxide, carbonate, etc., in an amount sufficient to precipitate the oxides in hydrous form. After washing the precipitate to remove at least most of any water-soluble salt present in the precipitate, the zeolite in finely divided state is thoroughly admixed with the precipitate together with added water or lubricating agent sufficient in amount to facilitate shaping of the mix as by extrusion.

Petroleum hydrocarbon distillates and other hydrocarbonaceous materials such as shale oil which contain at least a significant (5 volume percent) content of normal paraffins and/or slightly branched paraffins are satisfactory feeds for the upgrading process provided that they have a content of nitrogen-containing impurities, calculated as nitrogen, which is less than 5 ppmw, preferably less than 1 ppmw.

Although representative feeds include atmospheric or vacuum gas oils and fractions and mixtures thereof, for example, having normal boiling point ranges in the range 400° F.–1200° F., preferably 500° F.–850° F., feeds can include hydrocarbonaceous materials having a boiling point range of 180° F.–1200° F.

The feed may have sulfur-containing impurities. However, the resulting product, in general, will also contain undesirable sulfur-containing impurities to some degree. Preferably, the feeds for the present process contain, calculated as sulfur, less than 20 ppmw of sulfur-containing impurities.

PROCESS CONDITIONS

The process conditions satisfactory for use in the process of the invention may vary, depending upon such factors as the feed, the conversion desired, the catalyst age and the like. In general, satisfactory conditions include:

|  | Broad Range | Preferred Range |
| --- | --- | --- |
| Temperature, °F. | 500–800 | 550–750 |
| Pressure, psig | <200 | 0–25 |

The space velocity, LHSV, V/V/Hr. can be in the range of 0.5–15, preferably 0.5–10, more preferably 2–10, and most preferably 2–4.

The yield of $C_3$–$C_4$ olefins has been found to be very sensitive to the system pressure. Thus, at about 500 psig, the yield of these olefins is negligible. As the pressure is decreased below 500 psig, an increasingly significant yield of $C_3$–$C_4$ olefins is produced. These olefins are especially desirable and are valuable for many well-known uses in the petroleum and chemical processing arts, whereas their alkane counterparts are far less desirable products. The yield of $C_3$–$C_4$ olefins varies, depending upon the particular feed, conditions and catalyst employed, in the range of from about 2 to 10 weight percent of the feed converted.

DESCRIPTION OF THE FIGURES

The following figures illustrate the use of the upgrading process of the present invention in conjunction with other standard refining processes such as hydrocracking. For simplicity, standard equipment, such as compressors, pumps, and separators, are not illustrated.

FIG. 3 illustrates the sequential use of the upgrading process with a hydrocracker. The low nitrogen feed is introduced into the upgrading zone (2) via line (1). The upgraded effluent is removed from the upgrading reactor via a line (3) which introduces the upgraded effluent into a distillation zone (4) which separates the light gases and light olefins as well as the olefinic naphtha from the remainder of the upgraded effluent. The remainder of the effluent passes via a line (5) to a conventional hydrocracking zone (6) the effluent of which is removed and treated conventionally.

FIG. 4 illustrates the use of the upgrading process in a recycle mode with a conventional hydrocracker. The low nitrogen feed is introduced to the upgrading zone (12) via a line (11). The upgraded effluent passes from the upgrading reactor via a line (13) to a stripping zone (14) which removes the light paraffinic gases and olefins. The stripper bottoms pass by line (15) to a distillation zone (16) which separates the different petroleum fractions of boiling point less than 400° F. The distillation zone can also be operated to recover petroleum fractions boiling above 400° F. such as the jet fraction. The portion boiling above 400° F. is split into two streams, one of which passes through a line (17) and is recycled into the feed line (11). The second stream passes by line (18) into a hydrocracking zone (19) whose effluent passes into line (20) and is mixed with the upgraded effluent of line (15) before introduction into the distillation zone (16).

In FIG. 5, the denitrified feed is introduced into the upgrading zone (32) via a line (31). The upgraded effluent recovered from the upgrading zone is introduced via a line (33) into a distillation zone (34) to remove the light olefins and paraffins. The lower boiling effluent, typically less than 400° F., is introduced via line (35) into a standard hydrocracking zone (36). The hydrocracker effluent is conducted via a line (37) to a distillation zone (38), typically having a cut point ranging from 450° F.–572° F. The heavy cut is recycled via a line (39) into the denitrified feed of line (31) while the jet fuel fraction is recovered from the distillation zone.

The following specific examples will serve to further illustrate the process of the present invention and the advantages thereof.

EXAMPLE I

In a preferred embodiment a gas oil is dewaxed with a significant concurrent production of a $C_3$–$C_4$ olefin product fraction in good yield. A typical oil has the following characteristics:

| Boiling Point Range (ASTM D-1160), °F. | 445–820 |
| --- | --- |
| Gravity, °API | 37.8 |
| Aniline Point, °F. | 200 |
| Total Nitrogen, ppmw as N | 0.5 |
| Sulfur, ppmw as S | 20. |
| Ramsbottom Carbon | 0.5 |
| Refractive Index (80° C.) | 1.4375 |
| Density (70° C.) | 0.798 |
| Average Molecular Weight | 275 |
| Paraffins | 52.7 |
| Naphthenes | 36.3 |
| Aromatics | 10.7 |

The contacting of the feed with a catalyst consisting of a composite of ZSM-5-type zeolite in a porous alumina matrix (65/35 weight ratio of zeolite to matrix) is carried out in a fixed-bed reactor under conditions including:

| Temperature, °F. (average) | 750 |
| --- | --- |
| Space Velocity, LHSV, V/V/Hr | 2.0 |
| Total Pressure, psig | 25 |
| Hydrogen Partial Pressure, psia | 0 |
| Recycle Gas, SCF/B | 0 |

Typical results from use of the above-described representative feed and conditions include the following weight percent yields:

| | |
|---|---|
| C$_1$ | 0.0 |
| C$_2$ (total) | 0.01 |
| C$_3$ (total) | 2.86 |
| Propane | 1.59 |
| C$_4$ (total) | 9.66 |
| Butenes | 7.03 |
| C$_5$–180° F. | 12.19 |
| 180° F.–380° F. | 6.54 |
| 380° F.–500° F. | 7.24 |
| 500° F.–End Point | 61.60 |
| Total C$_5$+ | 87.49 |

Under the above conditions and using a low-nitrogen feedstock, the above catalyst experiences a fouling rate of only 0.02° F. per hour. This rate, surprisingly, is but about one-fifth the expected rate in view of the prior art, for example: (1) U.S. Pat. No. 4,067,797, N. Y. Chen et al; and (2) the article entitled "New Process Cuts Pour Point of Distillates" by N. Y. Chen et al, The Oil and Gas Journal, June 1977, pp. 165–170.

EXAMPLE II

Figure 1:
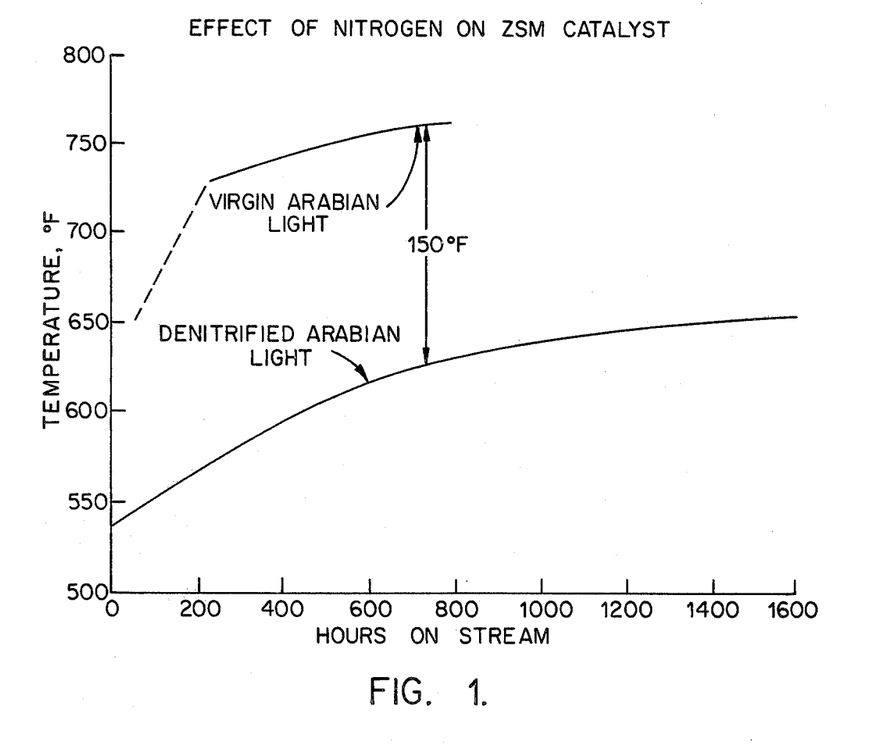
FIG. 1 shows the effect of nitrogen on the activity of a ZSM catalyst.

A comparison test was run to determine the effect of nitrogen on a ZSM catalyst. A raw Arabian Light oil and a hydrodenitrogenated (HDN) Arabian Light oil having the following properties:

| | Raw Arabian Light | HDN Arabian Light |
|---|---|---|
| Gravity °API | 27.4 | 37.5 |
| Aniline Point, °F. | 176.4 | 182.3 |
| Sulfur, wt % | 2.06 | 0.0037 |
| Total N, ppm | 445 | 0.74 |
| D-1160 Distillation | | |
| 10%/30% °F. | 693/733 | 464/566 |
| 50%/70% °F. | 756/776 | 641/699 |
| 90%/EP °F. | 809/870 | 761/837 |
| % Paraffinic Carbon | 65 | 63 |
| % Naphthenic Carbon | 16 | 25 |
| % Aromatic Carbon | 19 | 12 | were contacted over a catalyst containing 65% H-ZSM-5 and 35% alumina at atmospheric pressure, with no hydrogen or recycle gas, an LHSV=2, and a temperature adjusted to maintain a 17% conversion. The results of the test as shown in FIG. 1, indicate that initially the raw oil fouls the catalyst four times as fast as the denitrified oil, until equilibrium is reached. After equilibrium is reached, the catalyst which processes denitrified oil is about 150° F. more active than the catalyst which processes the raw oil, indicating the use of a ZSM-5-type catalyst with a denitrified oil will exhibit a much longer run life than catalyst processing raw oil.

EXAMPLE III

Figure 2:
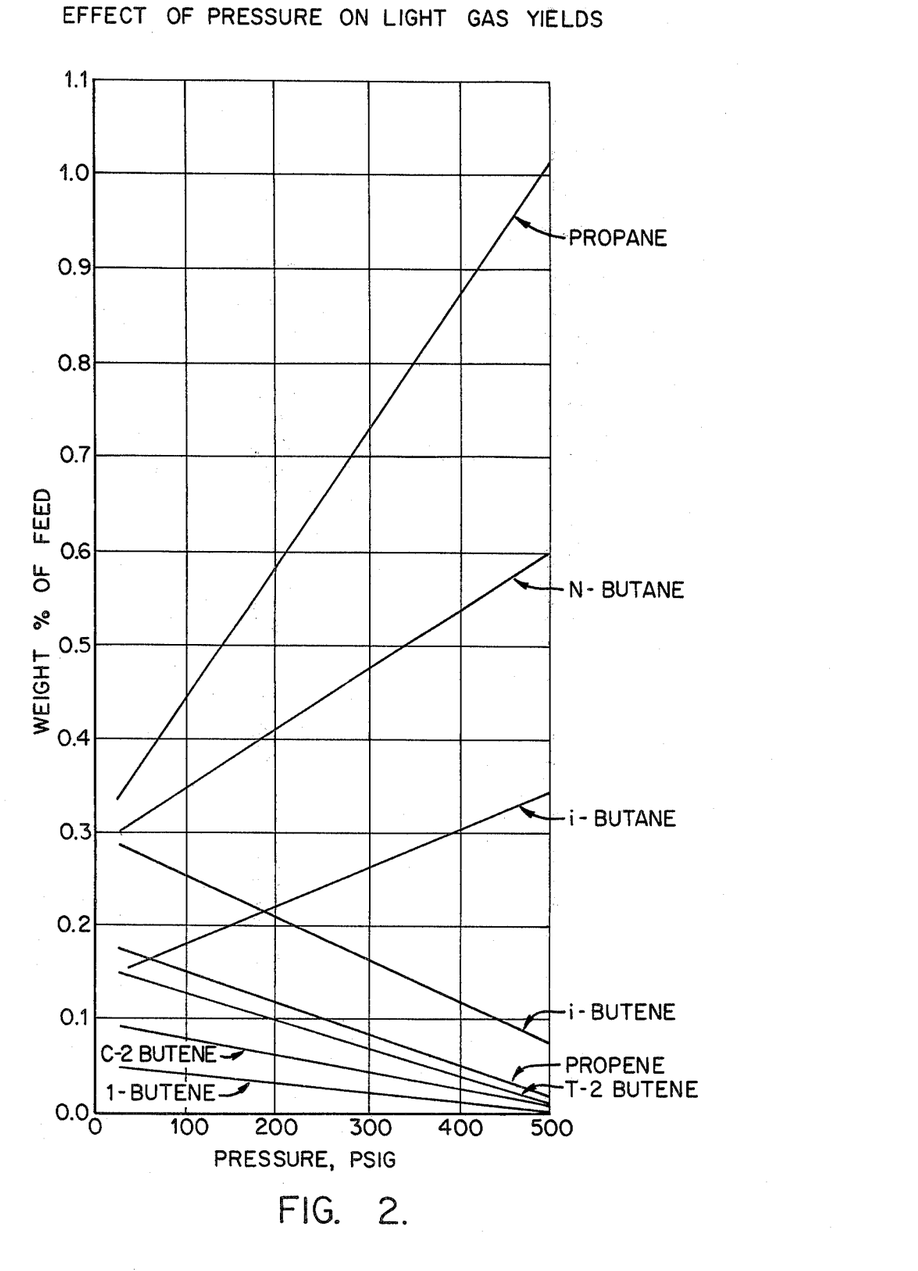
FIG. 2 shows the effect of pressure on light gas yield.
Figure 3:
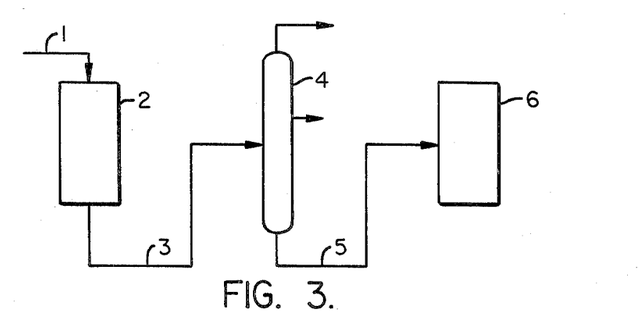

This experiment was carried out to show the effect of pressure on the yields of light paraffinic and olefinic gases. A hydrodenitrogenated gas oil having the following characteristics:

| | |
|---|---|
| Gravity, °API | 34.1 |
| Aniline Point, °F. | 170.3 |
| Sulfur, wt % | 0.0019 |
| Total N, ppm | 0.63 |
| D-1160 Distillation | |
| 10%/50%.90% °F. | 377/654/796 |
| Carbon Type, %P/%N/%A | 48.9/41.5/9.5 | was contacted with a catalyst consisting of 65% H-ZSM-5 and 35% alumina at mild conversion conditions including 600° F., LHSV-2, 2000 SCF/BBL recycle gas, and at the following pressures: 500 psig, 200 psig, 100 psig and 25 psig. The results, as shown in FIG. 2, indicate that the amount of olefins in the light product gas increases dramatically as the pressure is decreased—for example, at 500 psig, the ratio of the wt % C$_4$=(C$_4$ olefins) to total C$_4$ is 0.08, whereas at 100 psig, it is 0.46, and at 25 psig, it is 0.56. Thus, low pressure enhances the relative proportion of olefins produced in the light product gas.

INDUSTRIAL APPLICABILITY

The benefits of the present upgrading process go far beyond the recovery of valuable olefins where only less valuable light paraffin gases had previously been produced. The feedstocks for reforming operations preferably have a low content of paraffins. Although under reforming conditions some paraffins are converted to aromatics, many more are cracked to shorter chain length paraffinic gases. The result is that energy has been used to heat paraffins and drive their cracking instead of to drive the reforming reactions which produce the desired aromatics. Because these paraffins have been removed from the effluent of the present upgrading process, when that effluent is introduced into a reformer a significant efficiency increase and energy saving is achieved. The feedstock for the catalytic reforming process is typically all or part of the fraction of the process stream which boils below about 400° F., and preferably all or part of the 180° F.–400° F. fraction. An especially desirable reforming feedstock is the 180° F.–400° F. fraction of hydrocracker effluent where the hydrocracker feedstock is the process.

The upgrading process can also be used to increase the efficiency and effectiveness of hydrocarbon cracking processes through use of the upgrading process in conjunction with a standard hydrocracking process loop. FIG. 4 illustrates the low pressure upgrading process in a process loop with a conventional hydrocracker.

The low nitrogen feed is subjected to the low pressure ZSM-5-type catalyst upgrading process, a light gas fraction (C$_3$–C$_4$) comprising about 60% olefins, a gasoline fraction of improved octane and a heavy non-paraffinic fraction are split from the effluent. The heavy non-paraffinic fraction is subjected to a conventional hydrocracker which cracks the mixture to a naphthenic naphtha. A C$_4$ paraffin gas fraction is recovered while the C$_5$+ fraction can be recycled into the upgrading reactor. Removal of shorter, normal or slightly branched hydrocarbons through upgrading makes the hydrocracking process more profitable, as olefins are produced from the paraffins instead of the usual paraffinic gases. The amount of hydrogen required for processing a unit of feed is also reduced while the liquid yield is increased.

EXAMPLE IV

An experiment was performed to compare the results of a standard hydrocracking process in conjunction with an inactive upgrading reactor, to a process loop with the upgrading reactor activated. The process loop is illustrated in FIG. 5. The hydrodenitrified feed was an Arabian Light Gas Oil having the following characteristics:

| | |
|---|---|
| Gravity, °API | 37.5 |
| Aniline Point, °F. | 182.3 |
| Sulfur, ppm | 37 |
| Total Nitrogen, ppm | 0.74 |
| D-1160 Distillation, °F. | |
| 10%/50%/90% | 464/641/761 |
| Carbon Type %P/%N/%A | 63.1/24.9/11.9 |

The reaction conditions in the hydrocracking and upgrading reactors were as follows:

| | Standard | Standard & Upgrading |
|---|---|---|
| Hydrocracker | | |
| Temperature, °F. | 600 | 590 |
| Pressure, psig | 1,350 | 1,350 |
| LHSV | 1.4 | 1.4 |
| Upgrading Reactor | | |
| Temperature, °F. | 300 | 700 |
| | (inactive) | (active) |
| Pressure, psig | 0 | 0 |
| LHSV | 6.3 | 6.3 |
| Overall Conversion per pass (LV %) | 80.0 | 80.0 |
| Yields as % of Feed (w/w) | | |
| $C_2$-$C_4$ alkane | 16.7 | 13.6 |
| $C_2$-$C_4$ alkene | 0 | 11.0 |
| $C_5$-380° F. | 85.7 | 77.0 |
| Octane $C_5$-180° F. (Research, clear) | 85.7 | 92.9 |
| Hydrogen consumption SCFB | 1,237 | 922 |

As can be seen from the data, there were decreases in light paraffin gas production and hydrogen consumption, and increases in $C_5$-180° F. octane and $C_2$-$C_4$ alkene production. Additionally, the activity of the standard hydrocracking catalyst was improved by 10° F. when the upgrading reactor is activated.

EXAMPLE V

A similar experiment to that of Example IV was conducted using a less paraffinic, denitrified Empire Gas Oil having the following characteristics:

| | |
|---|---|
| Gravity, °API | 34.1 |
| Aniline Point, °F. | 170.3 |
| Sulfur, ppm | 19 |
| Total Nitrogen, ppm | 0.63 |
| D-1160 Distillation, °F. | |
| 10%/50%/90% | 477/654/796 |
| Carbon Type %P/%N/%A | 48.9/41.6/9.6 |

The reactor conditions in the hydrocracking and upgrading reaction were as follows:

| | Standard | Standard & Upgrading |
|---|---|---|
| Hydrocracker | | |
| Temperature, °F. | 596 | 607 |
| Pressure, psig | 1,200 | 1,200 |
| LHSV | 1.0 | 1.0 |
| Upgrading Reactor | | |
| Temperature, °F. | (Not in process) | 700 |
| Pressure, psig | loop | 0 |
| LHSV | | 6.3 |

-continued

| | Standard | Standard & Upgrading |
|---|---|---|
| Overall Conversion per pass (LV %) | 70.0 | 70.0 |
| Yields as % of Feed (w/w) | | |
| $C_2$-$C_4$ alkane | 14.5 | 13.1 |
| $C_2$-$C_4$ alkene | 0 | 4.4 |
| $C_5$-380° F. | 87.6 | 81.5 |
| Octane $C_5$-180° F. (Research, clear) | 85 | 90 |
| Hydrogen consumption SCFB | 1,167 | 1,093 |

As can be seen from the experiment, alkane production and hydrogen consumption were decreased while $C_5$-180° F. octane and olefin production were increased where the present upgrading process is used in conjunction with a conventional hydrocracker.

EXAMPLE VI

A pilot plant was set up to illustrate the use of the upgrading process in conjunction with a standard hydrocracking process. The flow chart for the pilot plant was as illustrated in FIG. 5. In general, the denitrified feed was introduced into the upgrading reactor. The upgraded effluent was passed to a first still from which the 380° F. and above effluent was recovered and introduced, with hydrogen-rich recycle gas, into a hydrocracker. The hydrocracker effluent was introduced first, into a high pressure separator to obtain the recycle gas and second, into a still to separate fractions boiling above and below 450° F. The fraction boiling above 450° F. was recycled into the feed for the upgrading reactor. The hydrocracker effluent fraction boiling below 450° F. and upgraded effluent boiling below 380° F. were further fractionated into $C_5$-180° F., 180° F.-230° F., 230° F.-380° F., and 380° F.-450° F. (jet cut) fractions.

The feed used had the following characteristics:

| | |
|---|---|
| Gravity, °API | 33.9 |
| Aniline Point, °F. | 162.6 |
| Sulfur, ppm | 10 |
| Total Nitrogen, ppm | 0.30 |
| D-1160 Distillation, °F. | |
| 10%/50%/90% | 483/633/781 |
| Carbon Type %P/%N/%A | 53.5/32.2/14.3 |

For the first part of the experiment (100 hours) the upgrading reactor was maintained at 300° F. so that it remained inactive although still within the process loop. The hydrocracker was maintained at 588° F., LHSV 0.6, total psig 1200, and hydrogen pressure 1024 psia. For the second part of the experiment, the temperature of the upgrading reactor was raised to 700° F. for operation; all other conditions in the upgrading reactor remained identical to those of the first part of the experiment. The conversion rate, in LV%, increased from 62.8 to 66.8 even though the hydrocracker gained 20° F. in activity (hydrocarbon catalyst temperature was reduced to 568° F.). The hydrogen consumption also declined from 1150 SCFB in the first part of the experiment to 842 SCFB in the second.

After 6000 hours operation of the pilot plant with the upgrading reactor active, there was no discernible decrease in the activity of the catalysts used in the process loop.

Yields were:

|  | Hydrocracker | Hydrocracker & Upgrader |
|---|---|---|
| $C_1$ (wt %) | 0.01 | 0.03 |
| $C_2$-$C_3$ alkane (wt %) | 2.06 | 3.63 |
| $C_2$-$C_3$ alkene (wt %) | 0 | 3.45 |
| $C_4$ alkane (vol %) | 16.23 | 13.21 |
| $C_4$ alkene (vol %) | 0 | 6.83 |

Compositions (vol%) of the higher boiling fractions were:

| | | | |
|---|---|---|---|
| $C_5$-180° F.: | P | 84.8 | 32.0 |
| | O | 0.0 | 20.0 |
| | N | 14.0 | 37.7 |
| | A | 0.6 | 10.4 |
| 180° F.-230° F.: | P | 48.2 | 31.3 |
| | O | 0.0 | 14.3 |
| | N | 48.3 | 45.3 |
| | A | 3.5 | 9.1 |
| 230° F.-380° F.: | P | 39.2 | 22.0 |
| | O | 0.0 | 4.3 |
| | N | 52.2 | 58.8 |
| | A | 8.2 | 14.9 |
| 380° F.-450° F.: | P | 27.7 | 10.3 |
| | O | 0.0 | 0.4 |
| | N | 55.7 | 78.0 |
| | A | 16.7 | 11.3 |

It can be seen from the data there was a significant improvement in the yield of olefins as well as an overall decrease in paraffin content.

The light naphtha fraction ($C_5$-180° F.), useful for gasoline, had a higher aromatic and olefin content, with a lower paraffin content, therefore a higher octane rating than when the upgrading reactor was inactive. The cuts boiling below 400° F. are particularly suitable for use in reformers because of their lower paraffin content.

EXAMPLE VII

A series of experiments were performed in a pilot plant to show the improvement in making jet fuel of the present invention. The jet fuel fraction produced can be used directly as jet fuel or as a suitable blending stock to extend a jet fuel pool. The general flow scheme is that of FIG. 5. A denitrified feed was introduced into the system and into the upgrading reactor. The upgraded effluent (or unchanged feed where the upgrading reactor was inactive) was passed into a distillation zone from which the olefin fraction ($C_2$-$C_4$ olefins and paraffins) and naphtha fraction ($C_5$-380° F.) were recovered. The remainder of the upgraded effluent was passed into a hydrocracking zone and then into a second distillation zone. The second distillation zone was set up to collect jet fuel having a boiling range from 350° F. to the recycle cut point. The recycle cut point was set at either 450° F. or 550° F. to yield jet fuel having a boiling range of 350° F.-450° F. or 350° F.-550° F. The component boiling above the recycle cut point was recycled into the feed stream. In general operations, the distillation column can be operated to yield a jet fraction boiling from a lower range of about 290° F.-380° F. to whatever upper range is desired, typically 450° F.-572° F.

The upgrading reactor catalyst was ZSM-5 (65%) composited in alumina (35%). The hydrocracking catalyst was a conventional composite containing nickel, tin, faujasite, and an amorphous silica and alumina base. The upgrading reactor was operated at atmospheric pressure, LHSV-3.4, and no recycle gas; the hydrocracker was operated at:

| | |
|---|---|
| $H_2$ pressure | 1075 psia, |
| Total Pressure | 1200 psig |
| Recycle gas | 4000 SCF/B |
| LHSV | 0.6 |

Both reactors were operated to give a 65 LV% total per pass conversion by varying the hydrocracker temperature. The denitrified feed had 20 LV% below 450° F. and 45 LV% below 550° F. and the following characteristics:

| | |
|---|---|
| API° | 33.9 |
| S, ppm | 10 |
| N, ppm | 0.31 |
| Pour Point, °F. | 45 |
| Chemical content, LV % | |
| Paraffins | 29.0 |
| Naphthenes | 48.0 |
| Aromatics | 22.8 |
| Sulfur compounds | 0.2 |
| Distillation °F., (D-1160-10) | |
| Start/5 | 337/448 |
| 10/30 | 483/568 |
| 50 | 633 |
| 70/90 | 689/781 |
| EP | 842 |

Four runs were performed, two each at recycle cut points of 450° F. and 550° F. with one run at each cut point having an inactive upgrading reactor and one having an activated reactor. Temperatures and product compositions and characteristics were:

| | | | | |
|---|---|---|---|---|
| Recycle Cut Point, °F. | 450 | 450 | 550 | 550 |
| Hydrocracker Temp, °F. | 589 | 567 | 579 | 559 |
| Upgrading Reactor Temp, °F. | Inactive | 700 | Inactive | 700 |
| Jet Yield, LV % | 15.9 | 17.5 | 35.8 | 38.1 |
| Jet Smoke Point, mm | 21 | 20 | 24 | 20 |
| Jet Freeze Point, °F. | <−94 | <−94 | −70 | −78 |
| $H_2$ Consumption, SCF/B | 1099 | 915 | 1024 | 827 |
| $C_2$-$C_4$ Olefins, wt % | 0 | 10.52 | 0 | 6.43 |
| Product Composition, LV % of Jet Cut: | | | | |
| Paraffins | 27.5 | 15.1 | 28.1 | 19.9 |
| Naphthenes | 54.0 | 77.4 | 64.4 | 72.5 |
| Aromatics | 18.5 | 7.5 | 7.5 | 7.7 |

EXAMPLE VIII

A second series of experiments was performed following the procedure of Example VII using the same catalysts and the same upgrading reactor conditions. The hydrocracker conditions were:

| | |
|---|---|
| LHSV | 1.35 |
| Total pressure | 1475 psig |
| $H_2$ pressure | 1325 psia |
| Recycle gas | 5500 SCF/B | the conversion was maintained at 65% below the recycle cut points of 470° F. and 550° F. by varying the hydrocracker temperature. The feed had the following characteristics:

| | |
|---|---|
| °API | 34.1 |
| S, ppm | 1.32 |
| N, ppm | 0.28 |
| Pour Point, °F. | 45 |
| Chemical Content, LV % | |
| Paraffins | 28.8 |
| Naphthenes | 55.0 |
| Aromatics | 16.2 |
| Distillation (D-1160-10) | |
| Start/5 | 486/520 |
| 10/30 | 532/572 |
| 50 | 621 |
| 70/90 | 673/744 |
| 95/EP | 771/835 |

Temperatures and product compositions and characteristics were:

| | | | | |
|---|---|---|---|---|
| Recycle Cut Point, °F. | 470 | 470 | 550 | 550 |
| Hydrocracker Temp, °F. | 577 | 568 | 574 | 556 |
| Upgrading Reactor Temp, °F. | Inactive | 750 | Inactive | 750 |
| Jet Yield, LV % | 11.0 | 17.1 | 28.2 | 35.0 |
| Jet Smoke Point, mm | 26 | 24 | 28 | 23 |
| Jet Freeze Point, °F. | <−94 | <−83 | −16 | −34 |
| $H_2$ Consumption, SCF/B | 1038 | 796 | 888 | 696 |
| $C_2$-$C_4$ Olefins, wt % | 0 | 5.40 | 0 | 4.39 |
| Product Composition, LV % of Jet Cut (400-EP): | | | | |
| Paraffins | 32.3 | 24.4 | 42.7 | 25.6 |
| Naphthenes | 62.5 | 69.5 | 52.8 | 65.7 |
| Aromatics | 5.2 | 6.2 | 4.5 | 5.6 |

From the results of Examples VII and VIII, it can be seen that the use of the upgrading reactor leads to reduced hydrogen consumption, increased hydrocracker activity, and increased olefin production. It can also be seen that a jet fuel or good quality jet fuel blending stock can be prepared using a high recycle cut point while using the upgrading reactor, and surprisingly, while increasing the jet fuel yield. By allowing the use of a higher recycle cut point (and by increasing jet range yields) the upgrading process of the present invention further increases the efficiency of refinery operations as well as the variety and versatility of options available to the refinery operator.

The jet fuel boiling range fraction recovered from the effluent of the hydrocracker is typically in the range of about 290° F.–572° F. The recycle cut temperature for the distillation of the hydrocracked effluent is typically a maximum of 572° F. (ASTM D-1655, Jet A or A-1) but can range down to 450° F.–470° F. The tests of Examples VII and VIII show that even using conventional recycle cut temperatures about 450° F.–470° F., processing efficiency is improved and jet yields are increased.

The process for increasing the effectiveness of hydrocarbon processing comprising:

(A) upgrading a hydrocarbonaceous feed having a normal boiling point range above about 180° F. and below about 1200° F., through use of an upgrading process comprising, (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said feed having a content of nitrogen-containing impurities, calculated by weight as nitrogen, below about 5 ppm; in conjunction with (B) converting the components of a hydrocarbonaceous feedstock is very effective and has applications using many well-known hydrocarbon conversion reactions as the conversion process in Step (B).

The conversion process of Step (B) can be a hydrocracking process, wherein the effluent from the hydrocracking process is the feed for the upgrading process, and further comprising the step of etherating all or part of the portion of the process stream which boils below about 225° F. The process stream contains a very high isoolefin content. Isoolefins are easily etherated under standard conditions by contacting all or part of the portion of the process stream which boils below about 225° F. with a $C_1$ to $C_3$ alcohol under acidic conditions. Such an etheration process will form the highly desirable gasoline additive methyl-t-butyl ether by the combination of isobutene with methanol over an acidic ion-exchange resin.

The process for increasing refinery efficiency can also have the conversion process of Step (B) as a hydrocracking process, but wherein the effluent from the hydrocracking process is the feed for the upgrading process, and further comprising the step of forming aromatics from all or part of the fraction of said process stream which boils below about 400° F., or further comprising the step of recovering a jet fuel fraction from the effluent of said hydrocracking process.

The process can also have Step (B) as a hydrocracking process, but wherein the process stream is the feedstock for the hydrocracking process, and further comprising the step of forming aromatics from all or part of the fraction of the effluent of said hydrocracking process which boils below about 400° F. Typical reaction conditions for forming aromatics can include those suitable for traditional dehydrocyclization processes or for aromatization reactions in which cracking is followed by recombination of the fragments.

The process for improving refinery efficiency can have the conversion process of Step (B) as a hydrocracking process, wherein the process stream is the feedstock for the hydrocracking process, and further comprising the steps of:

separating the process stream into at least one lower fraction boiling below about 400° F. and at least one higher fraction boiling above about 400° F.;

recovering the lower fraction; and feeding the higher fraction to the hydrocracking process as said feedstock.

Recovering the lower fraction from the process stream enables the refinery operator to perform desirable reactions such as etherating all or part of the portion of the lower fraction which boils below about 225° F. under etheration conditions by contacting said fraction with a $C_1$ to $C_3$ alcohol.

A particularly efficient process for producing jet fuel can be performed when the conversion process of Step (B) is hydrocracking, the upgrading process and the hydrocracking process are operated in a recycle mode, and further comprising the step of recovering a jet fuel fraction from the effluent of the hydrocracking process. The upgrading process and the hydrocracking process can be operated in a recycle mode, with the further step of forming aromatics from all or part of the fraction of the effluent of said hydrocracking process which boils below about 400° F.

The efficiency improving process wherein the conversion process of Step (B) is hydrocracking, wherein the upgrading process and the hydrocracking process are operated in a recycle mode, can further comprise the steps of:

separating the process stream into at least one lower fraction boiling below about 400° F. and at least one higher fraction boiling above about 400° F.;

recovering the lower fraction; and feeding the higher fraction to the hydrocracking process. This combination of steps is particularly efficient at producing an isoolefin containing fraction which boils below about 225° F. All or part of this fraction can be etherated under standard conditions by contacting the lower fraction with a $C_1$ to $C_3$ alcohol.

Where a lower fraction boiling below about 400° F. is recovered, the step of forming aromatics from all or part of the lower fraction can also be performed.

Because the process stream has a high content of olefins, especially isoolefins, an olefinic fraction which contains $C_2$ to $C_7$ olefins can be recovered and the olefinic fraction can be the hydrocarbon feedstock for the conversion process of Step (B). It can be appreciated that where the process stream is split into several fractions, each fraction can go through different conversion reactions.

Where a $C_2$ to $C_7$ olefin containing fraction is recovered from the process stream, many standard reactions can be performed. The conversion process of Step (B) can comprise polymerizing all or part of the $C_2$ to $C_7$ olefins contained in said olefinic fraction. By polymerization is meant forming dimers, trimers, and higher polymers from the olefins. The conversion process can comprise alkylating the olefinic fraction under alkylation conditions with isoalkanes. The conversion process can comprise aralkylating said olefinic fraction by contact with an aromatic compound such as benzene under aralkylation conditions. The process can comprise the step of hydrating all or part of the olefins in the olefinic fraction.

Where lubricating oils are being prepared, the upgrading step can be used to remove undesirable n-alkanes to produce olefins and the conversion process can comprise stabilizing the process stream to oxidation. Catalytic hydrofinishing and chemical finishing are examples of such stabilizing processes.

The extraordinarily high amount of olefins which can be easily etherated and which are present in the process stream is illustrated by an analysis of the $C_5$ and $C_6$ compounds in the process stream produced by Example VIII.

| $C_5$ Compound | Vol. % |
|---|---|
| n-pentane | 0.89 |
| iso-pentane | 0.05 |
| olefins: | |
| 3-methyl-1-butene | 0.01* |
| 1-pentene | 0.03 |
| 2-methyl-1-butene | 0.21* |
| 2-pentene (cis and trans) | 3.72 |
| 2-methyl-2-butene | 14.07* |

The $C_5$ compounds formed 18.98% of the $C_5$-300° F. product stream, and approximately 75% of the $C_5$ compounds (denoted by asterisk) would be easily etherated using standard techniques.

| $C_6$ Compounds | Vol. % |
|---|---|
| n-hexane | 0.00 |
| iso-hexane | 0.83 |
| olefins: | |
| n-hexenes | 21.11 |
| etherable methyl pentenes and dimethyl butenes | 31.49 |

The $C_6$ compounds formed 52.60% of the $C_5$-300° F. product stream, and approximately 60% of the $C_6$ compounds would be easily etherated using standard techniques.

A particularly efficient process for preparing the high octane gasoline additive methyl-t-butyl ether is obtained by feeding an isobutene containing portion of the product stream to an etheration conversion step using methyl alcohol, separating out the ether and unreacted methanol from the effluent of the etheration step, and returning the remainder of the effluent to the upgrading step where more isobutene will be formed.

What is claimed is:

1. A process for increasing the effectiveness of hydrocarbon processing, comprising:

(a) hydrocracking a hydrocarbonaceous feedstock having a normal boiling range above about 180° F. and below about 1200° F.;

(b) upgrading at least part of the effluent of said hydrocracking process through use of an upgrading process comprising, (i) producing a process stream containing at least a substantial amount of $C_3$ to $C_4$ olefins by contacting said effluent part with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly spaced velocity in the range of from about 0.1 to 20, said effluent having a content of nitrogen-containing impurities, calculated by weight as nitrogen, below about 5 ppm; and (c) etherating all or part of the portion of said process stream which boils below about 225° F.

2. A process according to claim 1 wherein said etheration is performed by contacting said portion of said process stream with a $C_1$ to $C_3$ alcohol under etheration conditions.

3. A process for increasing the effectiveness of hydrocarbon processing, comprising:

(a) upgrading a hydrocarbonaceous feed having a normal boiling range above about 180° F. and below about 1200° F., through use of an upgrading process comprising, (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said feed having a content of nitrogen-containing impurities, calculated by weight as nitrogen, below about 5 ppm; and (b) recovering a jet fuel fraction from said process stream.

4. A process for increasing the effectiveness of hydrocarbon processing, comprising:
 (a) hydrocracking a hydrocarbonaceous feedstock having a normal boiling range above about 180° F. and below about 1200° F.;
 (b) upgrading at least part of the effluent of said hydrocracking process through use of an upgrading process comprising,
  (i) producing a process stream containing at least a substantial amount of $C_3$ to $C_4$ olefins by contacting said effluent part with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said effluent having a content of a nitrogen-containing impurities, calculated by weight as nitrogen, below about 5 ppm; and
 (c) forming aromatics from all or part of the fraction of said process stream which boils below about 400° F.

5. A process for increasing the effectiveness of hydrocarbon processing, comprising:
 (a) upgrading a hydrocarbonaceous feed having a normal boiling range above about 180° F. and below about 1200° F., through use of an upgrading process comprising,
  (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said feed having a content of nitrogen-containing impurities, calculated by weight as nitrogen, below about 5 ppm;
 (b) hydrocracking at least part of said process stream; and
 (c) recovering a jet fuel fraction from the effluent of said hydrocracking step.

6. A process for increasing the effectiveness of hydrocarbon processing, comprising:
 (a) upgrading a hydrocarbonaceous feed having a normal boiling range above about 180° F. and below about 1200° F., through use of an upgrading process comprising,
  (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hoursly space velocity in the range of from about 0.1 to 20, said feed having a content of nitrogen-containing impurities, calculated by weight as nitrogen, below about 5 ppm;
 (b) hydrocracking at least part of said process stream; and
 (c) forming aromatics from at least part of the fraction of the effluent of said hydrocracking step which boils below about 400° F.

7. A process for increasing the effectiveness of hydrocarbon processing, comprising:
 (a) upgrading a hydrocarbonaceous feed having a normal boiling range above about 180° F. and below about 1200° F., through use of an upgrading process comprising,
  (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said feed having a content of nitrogen-containing impurities, calculated by weight as nitrogen, below about 5 ppm;
 (b) separating said process stream into at least one lower fraction boiling below about 400° F. and at least one higher fraction boiling above about 400° F.;
 (c) recovering said lower fraction; and
 (d) hydrocracking at least part of said higher fraction.

8. A process according to claim 7 further comprising the step of etherating all or part of the portion of said lower fraction which boils below about 225° F.

9. A process according to claim 8 wherein said etheration is performed by contacting said fraction with a $C_1$ to $C_3$ alcohol under etheration conditions.

10. A process for increasing the effectiveness of hydrocarbon processing, comprising:
 (a) hydrocracking a hydrocarbonaceous feedstock having a normal boiling range above about 180° F. and below about 1200° F.;
 (b) upgrading at least part of the effluent of said hydrocracking process through use of an upgrading process comprising,
  (i) producing a process stream containing at least a substantial amount of $C_3$ to $C_4$ olefins by contacting said effluent part with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said effluent having a content of nitrogen-containing impurities, calculated by weight as nitrogen, below about 5 ppm; wherein said upgrading process and hydrocracking step are operated in a recycle mode; and
 (c) recovering a jet fuel fraction from the effluent of said hydrocracking process.

11. A process for increasing the effectiveness of hydrocarbon processing, comprising:

(a) hydrocracking a hydrocarbonaceous feedstock having a normal boiling range above about 180° F. and below about 1200° F.;
(b) upgrading at least part of the effluent of said hydrocracking process through use of an upgrading process comprising,
   (i) producing a process stream containing at least a substantial amount of $C_3$ to $C_4$ olefins by contacting said effluent part with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said effluent having a content of nitrogen-containing impurities, calculated by weight as nitrogen, below about 5 ppm; wherein said upgrading process and hydrocracking step are operated in a recycle mode; and
(c) forming aromatics from all or part of the fraction of the effluent of said hydrocracking step which boils below about 400° F.

12. A process for increasing the effectiveness of hydrocarbon processing, comprising:
(a) hydrocracking a hydrocarbonaceous feedstock having a normal boiling range above about 180° F. and below about 1200° F.;
(b) upgrading at least part of the effluent of said hydrocracking process through use of an upgrading process comprising,
   (i) producing a process stream containing at least a substantial amount of $C_3$ to $C_4$ olefins by contacting said effluent part with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said effluent having a content of nitrogen-containing impurities, calculated by weight as nitrogen, below about 5 ppm; wherein said upgrading process and hydrocracking step are operated in a recycle mode; and further comprising separating said process stream into at least one lower fraction boiling below about 400° F. and at least one higher fraction boiling above about 400° F.; recovering said lower fraction; and feeding at least part of said higher fraction to said hydrocracking step.

13. A process according to claim 12 further comprising the step of etherating all or part of the portion of said lower fraction which boils below about 225° F.

14. A process according to claim 13 wherein said etheration is performed by contacting said lower fraction with a $C_1$ to $C_3$ alcohol under etheration conditions.

15. A process according to claim 7 or 12 further comprising the step of forming aromatics from all or part of said lower fraction.

16. A process for increasing the effectiveness of hydrocarbon processing, comprising:
(a) upgrading a hydrocarbonaceous feed having a normal boiling range above about 180° F. and below about 1200° F. through use of an upgrading process comprising,
   (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said feed having a content of nitrogen-containing impurities, calculated by weight as nitrogen, below about 5 ppm; and
(b) recovering from said process stream an olefinic fraction which contains $C_2$ to $C_7$ olefins.

17. A process according to claim 16, further comprising polymerizing all or part of the olefins contained in said olefinic fraction.

18. A process according to claim 16, further comprising aralkylating all or part of said olefinic fraction by contact with an aromatic compound under arylalkylation conditions.

19. A process according to claim 18, wherein said aromatic compound is a substituted or unsubstituted benzene compound.

20. A process according to claim 16, further comprising hydrating all or part of the olefins in said olefinic fraction.

21. A process for increasing the effectiveness of hydrocarbon processing, comprising:
(a) upgrading a hydrocarbonaceous feed having a normal boiling range above about 180° F. and below about 1200° F. through use of an upgrading process comprising,
   (i) producing a process stream containing at least a substantial amount of $C_3$ to $C_4$ olefins by contacting said feed with a catalyst comprising a ZSM-5-type crystalline aluminosilicate zeolite in a form which is substantially free of hydrogenation activity, said contacting being under conditions including (a) a temperature in the range of from about 500° F. to about 800° F.; (b) a pressure below about 13 atmospheres gauge; and (c) a liquid hourly space velocity in the range of from about 0.1 to 20, said feed having a content of nitrogen-containing impurities, calculated by weight as nitrogen, below about 5 ppm; and
(b) stabilizing at least part of said process stream to oxidation.

22. A process according to claim 21 wherein said stabilizing step comprises catalytic hydrofinishing.

23. A process according to claim 21 wherein said stabilizing step comprises chemical finishing.

24. A process according to claim 16 further comprising etherating all or part of the olefins in said olefinic fraction.

25. A process according to claim 24 wherein said etheration is performed by contacting said olefins with a $C_1$ to $C_3$ alkyl alcohol under etheration conditions.

26. A process according to claim 25 wherein said alcohol is methyl alcohol and said olefins comprise isobutene.

27. A process according to claim 25 further comprising recovering the ethers from the effluent of said etheration step and recycling all or part of the remainder of said effluent to said upgrading step.

28. A process according to claim 16, further comprising alkylating at least part of said olefinic fraction under alkylation conditions.

* * * * *